United States Patent
Sarchi et al.

(10) Patent No.: US 8,912,889 B2
(45) Date of Patent: Dec. 16, 2014

(54) MONITORING METHOD AND SYSTEM FOR DETECTING THE TORSION ALONG A CABLE PROVIDED WITH IDENTIFICATION TAGS

(75) Inventors: Davide Sarchi, Milan (IT); Bernd Knuepfer, Milan (IT); Giacomo Coletta, Milan (IT); Arnd-Guenther Carl, Milan (IT); Carsten Kemnitz, Milan (IT); Roberto Gaspari, Milan (IT); Thomas Kittel, Milan (IT); Reiner Ewald, Milan (IT)

(73) Assignee: Prysmian S.p.A., Milan (IT)

( * ) Notice: Subject to any disclaimer, the term of this patent is extended or adjusted under 35 U.S.C. 154(b) by 313 days.

(21) Appl. No.: 13/496,865

(22) PCT Filed: Sep. 16, 2009

(86) PCT No.: PCT/EP2009/062031
§ 371 (c)(1),
(2), (4) Date: Mar. 16, 2012

(87) PCT Pub. No.: WO2011/032587
PCT Pub. Date: Mar. 24, 2011

(65) Prior Publication Data
US 2012/0182130 A1 Jul. 19, 2012

(51) Int. Cl.
*G06K 7/01* (2006.01)
*G01L 5/04* (2006.01)

(52) U.S. Cl.
CPC .................................. *G01L 5/047* (2013.01)
USPC ................... 340/10.1; 340/572.1; 340/686.1

(58) Field of Classification Search
CPC ........... G06K 7/01; G08C 17/02; G01L 5/047
USPC .............. 340/10.1, 572.1, 686.1, 686.3, 665, 340/668, 671, 539.22; 73/650, 814, 847; 702/43
See application file for complete search history.

(56) References Cited

U.S. PATENT DOCUMENTS 4,388,710 A * 6/1983 Pecon, Jr. ...................... 367/134
(Continued)

FOREIGN PATENT DOCUMENTS

| CA | 2 581 186 A1 | 4/2006 |
|---|---|---|
| DE | 39 34 718 A1 | 12/1990 |
| DE | 10 2004 051 594 A1 | 5/2006 |
| GB | 2 368 921 A | 5/2002 |
| GB | 2 401 940 A | 11/2004 |
| JP | 2009-053048 | 3/2009 |
| WO | WO 01/78086 A1 | 10/2001 |

(Continued)

OTHER PUBLICATIONS

International Search Report from the European Patent Office for International Application No. PCT/EP2009/062031, mailing date May 26, 2010.

*Primary Examiner* — Edwin Holloway, III
(74) *Attorney, Agent, or Firm* — Finnegan, Henderson, Farabow, Garrett & Dunner, L.L.P.

(57) ABSTRACT

A method for monitoring the torsion of a cable includes the steps of: providing a cable having an outer surface and extending along a longitudinal direction, the cable being provided with at least one identification tag, preferably an RFID tag, arranged in a tag angular position in a cross-sectional plane taken transverse to the longitudinal direction, the at least one tag storing a tag identification code and being capable of transmitting a tag electromagnetic signal; interrogating the at least one identification tag to receive the tag electromagnetic signal, and detecting the tag electromagnetic signal, wherein the step of detecting the tag electromagnetic signal includes the step of reading the tag identification code and determining the tag angular position of the at least one identification tag. A torsion monitoring system of a cable includes at least one identification tag.

21 Claims, 8 Drawing Sheets

(56) References Cited

U.S. PATENT DOCUMENTS

| | | |
|---|---|---|
| 5,767,956 A | 6/1998 | Yoshida |
| 6,237,421 B1 | 5/2001 | Li et al. |
| 6,247,359 B1 | 6/2001 | De Angelis |
| 2004/0258373 A1 | 12/2004 | Andreassen |
| 2006/0071787 A1* | 4/2006 | Hoepken et al. ......... 340/539.23 |
| 2007/0120684 A1 | 5/2007 | Utaka et al. |
| 2007/0241890 A1 | 10/2007 | Yoshioka |
| 2008/0204235 A1 | 8/2008 | Cook |
| 2011/0167920 A1* | 7/2011 | Rink et al. ..................... 73/760 |

FOREIGN PATENT DOCUMENTS

| | | |
|---|---|---|
| WO | WO 03/038839 A1 | 5/2003 |
| WO | WO 2005/035461 A1 | 4/2005 |
| WO | WO 2007/104915 A1 | 9/2007 |
| WO | WO 2007/107693 A1 | 9/2007 |
| WO | WO 2008/037291 A1 | 4/2008 |
| WO | WO 2008/073033 A1 | 6/2008 |
| WO | WO 2011/033539 A1 | 3/2011 |

\* cited by examiner

MONITORING METHOD AND SYSTEM FOR DETECTING THE TORSION ALONG A CABLE PROVIDED WITH IDENTIFICATION TAGS

CROSS REFERENCE TO RELATED APPLICATION

This application is a national phase application based on PCT/EP2009/062031, filed Sep. 16, 2009, the content of which is incorporated herein by reference.

FIELD OF THE INVENTION

The present invention relates to a monitoring method and system for detecting the mechanical torsion of a cable.

BACKGROUND OF THE INVENTION

Cables for heavy-duty applications and in particular for mobile installations, such as mobile harbour cranes, ship-to-shore container cranes, ship un-loaders, spreaders, mining and tunnelling equipment, and windmill and windfarm are specifically designed to withstand harsh environment conditions and high mechanical stresses, such as tensile forces and torques. Within the present description, we will in general refer to heavy-duty cables, when referring to cables for heavy-duty applications and in particular, but not exclusively, for mobile installations.

An example of heavy-duty electric cable is provided in DE patent application No. 3934718, which describes an armoured trailing cable for shearer loaders in mines.

WO 01/78086 discloses an electric cable in particular for use in a pick-up system such as a crane or shelving system. The cable comprises a core, which includes first conductors, completely surrounded by and embedded within a first stress-bearing matrix. At least one further layer is disposed about the first stress-bearing matrix and has at least one further conductor in the further layer which is completely surrounded by and embedded within a second stress-bearing matrix. The stress-bearing matrices in the cable are said to allow the distribution of stress throughout the cable and thus to substantially reduce the corkscrew effect.

U.S. Pat. No. 6,247,359 describes an apparatus for identifying the need to replace a synthetic fiber rope constructed of at least two concentric layers of strands laid together and made from load-bearing aramid fiber strands comprising an indicating device visible on an exterior surface of the rope for detecting and visually indicating a rotational position of the rope about its longitudinal axis.

The Applicant has observed that conventional methods of evaluation of the torsion of a cable based on visual detection of a coloured line or marks along the cable length are often not reliable since they strongly depend on the condition of the cable external surface, for example they are affected by the presence of dirt or scratches. Furthermore, such methods generally do not provide quantitative data on the amount of torsion applied to the cable.

Non-contact torque sensors find wide application in measuring stresses in a shaft or driveline component of a vehicle during operation.

US 2007/0241890 describes an apparatus for measuring at least one physical characteristic, e.g., torque, of a shaft or driveline component of a vehicle. A radio frequency (RF) tag is associated with the shaft to facilitate communication to an RF reader. The RF tag is capable of storing a physical characteristic of the driveline component such as torque. The RF reader includes a transmitter provided to send modulated radio frequency transmissions that both supply power to the RF tag and associated sensor and trigger a responsive transmission signal indicative of sensed torque. The frequency tag reader is positioned adjacent to the driveline component and operable to read the signal transmitted by the RF tag. The RF tag may be continuously triggered and read by the RF modulator/reader in rapid cycles to facilitate continuous monitoring of object to be sensed.

Radio frequency identification ("RFID") elements embedded in a cable can facilitate locating and identifying the cable. The RFID elements or transponders can provide information about the cable—for example, identification number, time of deployment, manufacturing batch—to a remote RFID reader without directly accessing or handling the cable. This can be particularly useful in situations such as when the cable buried underground, suspended overhead, or installed in a cable tray.

US 2007/0120684 discloses a cable identifying system used with RFID built-in cable including therein RFID tags, each RFID tag having a responder comprising a radio transmitter/receiver and a memory device, operable without physical contact, the system comprising an external information storage apparatus that is to store the entire information on the ID data stored in the memory devices incorporated in all the RFID tags included in the RFID built-in cable. An antenna used for the RFID reader with a pair of semi-cylindrical members is disclosed. It is said that by using this type of antenna, the exact location of each RFID tag cannot be detected, but the information from the antenna incorporated in the RFID tag can be effectively detected irrespective of the position of the tag in the cable.

US 2008/0204235 discloses an optical fibre cable comprising a nonconductive tape extending a length of the cable and a plurality of RFID transponders disposed periodically along a length of the tape, wherein the radio frequency identification transponders report information that can facilitate locating and identifying the cable. Each RFID element has a unique code, thereby providing a record of manufacturing parameters that are specific of that cable. The unique code can be specific to an incremental length of the cable.

In some applications, such as in heavy-duty applications, transfer of the cable to the equipment reels and forced guidance during the winding and unwinding phases may give rise to undesired torsions that can vary along the cable length. Although care is normally recommended in handling and installation of the cable in the mobile equipments, such as a direct transfer of the cable from the original drum to the cable reel while avoiding changes of direction or inversions of the original direction of winding, working conditions may induce relatively large and abrupt torques thereof In addition, other systems for cable movement, such as guidance devices, pulley systems and tender systems, may involve torsions of the cable during operation, in particular if applications require high-speed operation and/or multiple cable deflection in the cable payout.

The Applicant has tackled the problem of detecting the presence of torsion in a cable in use and of providing a reliable measurement of the actual deployment of the cable, which can be performed throughout the lifetime of the cable.

SUMMARY OF THE INVENTION

Due to the mechanical stresses imposed during normal operation, the typical lifetime of a heavy-duty cable is in general relatively short and, depending on the application, can vary from few months to few years. The Applicant has observed that it would be advantageous to provide a monitoring system that permits control of the torsion in an electric cable, in particular in a heavy-duty cable, during its operation. By knowing the temporal evolution of the cable torsional condition, an effective periodic maintenance of the cable can be scheduled and carried out without inconvenience.

In particular, the Applicant has realized that it would be advantageous to monitor in situ the actual deployment of a cable by placing a monitoring system in correspondence to parts of the mobile equipment where the cable is expected to undergo significant torsional stresses.

In many applications, especially heavy-duty, a cable has one end fixed into a reel of a mobile equipment, such a crane for hoisting container or cargo or a mining equipment, and the opposite end fixed to a power supply unit for supplying power to the cable and/or to transmit data and control signals. The power supply unit is generally located at a fixed position, whereas the mobile equipment runs across a selected area of movements of goods or materials.

The Applicant has realised that it would be particularly advantageous to record the time variation of cable torsion for at least one longitudinal cable section, i.e. the variation of torsional state of cable sections along the length thereof, which can damage the cable by fatigue and shorten its lifetime.

In particular, by providing a cable with at least one identification tag detectable by a reading device, the tag being radially arranged in a detectable angular position, it is possible to measure the variation of the angular position of the tag, and thus to infer the local rotational state of the cable. From that, if the cable is fixed or motionless at least one of its ends, it is possible to infer whether the cable experiences a torsion (and so a torque) at some location along the cable length.

Within the present description and appended claims, with "torsion" it is meant a condition of stress and deformation caused when one end of the cable is rotated (twisted) in one direction and the opposite end is fixed (or motionless) or is twisted in an opposite direction. Torsion may be caused also when a first longitudinal section of the cable length is twisted and a second longitudinal section is fixed or twisted in an opposite direction.

In an aspect, the present invention relates to a method for monitoring the torsion of a cable comprising the steps of: providing a cable having an outer surface and extending along a longitudinal direction, the cable being provided with at least one identification tag arranged in a tag angular position in a cross-sectional plane taken transverse to the longitudinal direction, the at least one tag storing a tag identification code and being capable of transmitting a tag electromagnetic signal; interrogating the at least one identification tag to receive the tag electromagnetic signal, and detecting the tag electromagnetic signal, wherein the step of detecting the tag electromagnetic signal comprises the step of reading the tag identification code and determining the tag angular position of the at least one identification tag.

In another aspect, the present invention related to a torsion monitoring system for a cable comprising: a cable having an outer surface and extending along a longitudinal direction, the cable being provided with at least one identification tag arranged in a tag angular position in a cross-sectional plane taken transverse to the longitudinal direction, the at least one tag storing a tag identification code and being capable of transmitting a tag electromagnetic signal, and at least one reading device being arranged around at least one portion of the cable outer surface and being apt to interrogate the at least one tag, to read its tag identification code and to detect its tag angular position.

In the preferred embodiments, the reading device is arranged with respect to the cable so as to surround the outer surface, which is preferably circumferential, of the cable and to allow the cable to be movable relatively to the reading device.

In an embodiment, the monitoring system comprises a first and a second reading device placed at a predetermined distance from one to another and the cable is movable relatively to both reading devices. The local rotational state of a longitudinal section of the cable is evaluated by measuring a first angular position of at least one tag by the first reading device and a second angular position of the same tag by the second reading device and by determining the difference between the first and second angular positions.

In some preferred embodiments, the cable comprises a plurality of identification tags arranged along a cable length, each tag of the plurality storing a respective tag identification code and being capable of transmitting an electromagnetic signal. The longitudinal distance between next adjacent tags can be selected in view of the kind of cable to be monitored and of the performance requested thereto on the basis of the cable manufacturer's experience. Each tag is radially arranged in respective angular positions. By determining the variation of the angular position of a plurality of tags it is possible to infer the local rotational state in a plurality of longitudinal sections of the cable.

In particular, the angular difference of two adjacent tags of the plurality of identification tags can provide a map of the torsional state of the cable along its length.

In the preferred embodiments, the at least one identification tag is a radio frequency (RF) identification tag, namely a RFID tag, capable of emitting an RF signal and the at least one reading device is apt to read the RF signals transmitted by the RF tags.

BRIEF DESCRIPTION OF THE DRAWINGS

The present invention will be now described more fully hereinafter with reference to the accompanying drawings, in which some, but not all embodiments of the invention are shown. Drawings illustrating the embodiments are not-to-scale schematic representations.

DETAILED DESCRIPTION

Figure 1:
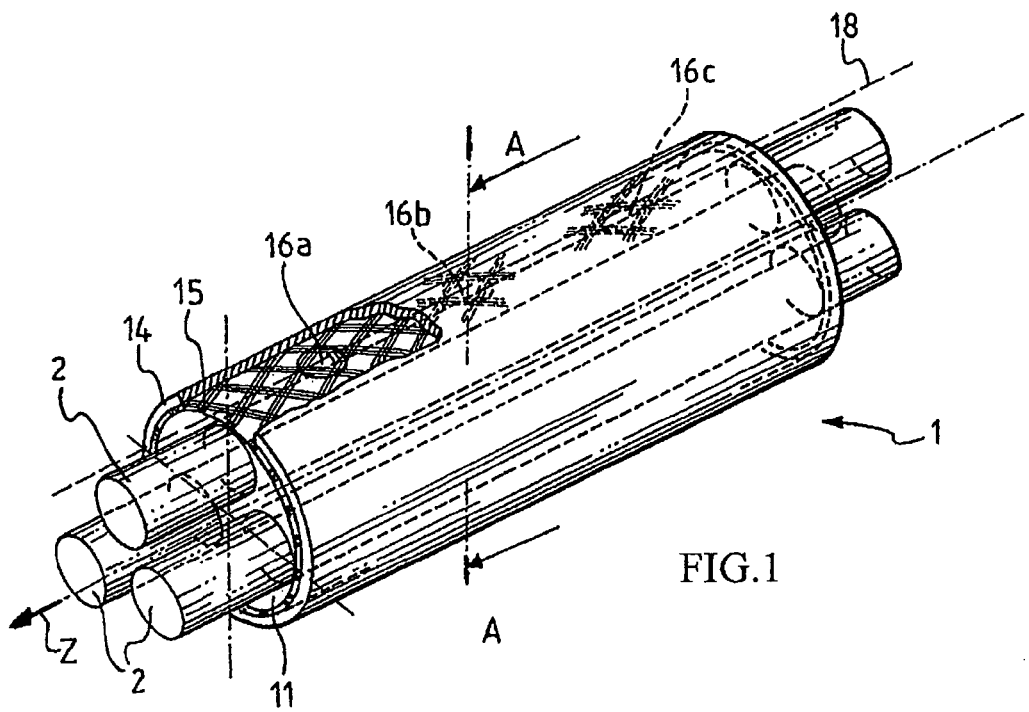
FIG. 1 is a partial perspective view of an electric cable, in an embodiment of the present invention.
Figure 2:
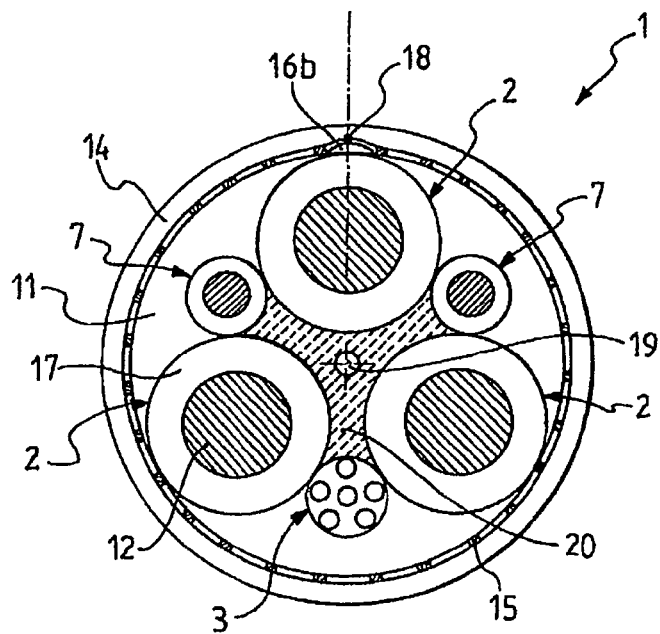
FIG. 2 is a schematic cross-sectional view taken along the A-A line of FIG. 1 and showing some more details of the internal cable structure than FIG. 1.

FIG. 1 is a schematic perspective view of an electric cable, in particular a heavy-duty cable, according to an embodiment of the present invention. FIG. 2 schematically illustrates a cross-sectional view of the electric cable of FIG. 1 taken along the A-A line. Not all details of the cable internal structure shown in FIG. 2 are illustrated in FIG. 1, to improve clarity of the latter figure. Cable 1 extends along a central longitudinal axis Z and comprises three cores 2 radially arranged about a central longitudinal axis Z. For instance, the cores 2 provide three-phase power transmission. Each core 2 can have a conventional structure, for example it comprises an electrical conductor 12, such as a copper conductor formed by a bundle of tinned copper electrical wires stranded together according to conventional methods. In radial external position with respect to each electrical conductor 12, an insulating layer 17 is provided. In some cable constructions, the electrical conductor can be surrounded by a plurality of layers. For instance, the insulating layer can be sandwiched between two layers of semi-conductive material, the layers being made of polymeric-based materials that can be extruded one on top of the other and externally to the conductor 12. Cable 1 can be a low or medium voltage power cable, where low voltage indicates a voltage of up to 1 kV and medium voltage indicates a voltage of from 1 kV to 60 kV.

A central thread member 19 is arranged along the central longitudinal axis Z. In the embodiment shown in FIG. 2, the cable comprises two ground conductors 7, for example in form of a bundle of stranded tinned copper electrical wires. Especially for medium-voltage applications, the bundle of electrical wires of the earth conductors can be surrounded by a semi-conductive layer. The ground conductors 7 are arranged radially external with respect to the central thread member 19 and are stranded together with the cores 2 along a cable longitudinal direction. In particular, cores 2 and ground conductors 7 are wound about the central thread member 19, in accordance with conventional methods.

The number of cores and/or of ground conductors is purely exemplary, in order to provide an example of an electric cable, and in particular of a heavy-duty cable.

Cable 1 preferably includes an optical fibre element 3 comprising a plurality of optical fibres, e.g., from 6 to 18 fibres, for transmission of control signals, voice, video and other data signals. The optical fibre element 3 can be stranded together with the cores 2 and ground conductors 7.

Cores 2 and, if present, ground conductors 7 and/or the optical fibre element 3, are herein collectively referred to as the longitudinal structural elements of the electric cable. Electric cables for heavy-duty applications are typically designed to be robust and flexible. In some embodiments, the cable 1 may include a polymeric filler 20 extruded around the central thread member 19, the filler 20 being sometimes called cradle separator due to its function of maintaining the distance between the longitudinal structural elements radially external to the central tread member and filling the interstitial space radially internal the elements. The cradle separator 20 can be formed by a semi-conductive elastomer, such as NBR-based elastomer. The longitudinal structural elements are surrounded by an inner sheath 11, preferably having elastic properties, e.g., by an EPR-based elastomer, to maintain geometrical stability within the cable. Stabilisation of the shape of the cable can be obtained, instead of with the use of an inner sheath, with a plurality of interstitial fillers filling the interstitial space radially external to the structural elements, which are optionally covered by a reinforcing tape (example not shown in the figure).

It is to be understood that the above description of the electric cable structure represents only one of the possible structures of a heavy-duty cable, as the invention is not limited to a particular internal structure or the number of structural elements within the cable For instance, the cable cores can be in general phase cores for power transmission, cores for carrying control signals or cores carrying both power and control signals.

With reference in particular to FIG. 1, a plurality of identification tags from 16a, 16b, 16c, . . . , which are detectable by a reading device, are arranged along the cable length on a circumferentially extending peripheral surface of the cable. The number of identification tags shown in the figure is purely exemplary, as the figure represents only a partial perspective view of the cable. Herein, with identification tag it is meant a device readable without physical contact, i.e., contactless, by a reading device and in particular capable of transmitting a univocal identification code using electromagnetic fields. The identification code of a tag of the plurality is univocal with respect the others tags of the plurality.

An outer jacket 14 encircles the inner sheath 11, for example is applied by extrusion over it. In the preferred embodiments, the identification tags are built in the cable structure, preferably disposed under the outer jacket of the cable, in order to provide mechanical and wear protection against the external environment. In some embodiments, the identification tags are placed on the external surface of the inner sheath 11. In the illustrated cable, to increase the torsion resistance of the electric cable, a reinforcement layer 15, such as a braid or a double spiral of reinforcing yarns, for example of polyester yarns, for instance made of Kevlar®, is applied on the outer surface of the inner sheath 11 before the application of the outer jacket 14.

The RFID tags 16a, 16b, 16c, . . . can be glued on the inner sheath 11 or they can be fixed by the application of the reinforcement layer 15 (if present) or of the outer jacket 14 on top of them.

In the preferred embodiments, the identification tags are radio-frequency identification (RFID) tags. The basic principles of operation of an RFID reading system are per se known. RFID tags are remotely interrogated by a reading device and communication between the reading device and the remote tag is enabled by radio-frequency (RF) signals. Each RFID tag is basically a transponder comprising a memory circuitry, usually in a microchip, for storing data information and an antenna for receiving and transmitting RF signals. In addition, each tag comprises an RF module for modulating and demodulating an RF signal. Data information stored in the memory circuitry contains a univocal identification code, such as a binary code. Optionally, data information may contain other data identifying the cable, such as its manufacturing date, the cable length, cable type and so on. Preferably, the memory circuitry stores information data relating to the longitudinal position of the tag along the cable length.

An RIFD tag can be of active type, if it monitors for interrogating signals from the reading device. When an interrogating signal directed to the active tag is sensed, the tag response may be electromagnetic signals using power from an internal battery or power source. Alternatively, RFID tags are of passive type and, unlike active RFID tags, have no internal battery or power source. The passive tag generates an electromagnetic field when RF waves from a reading device reach the tag's antenna. This electromagnetic field powers the tag and enables it to send back information stored on the memory circuitry to the reading device.

Preferably, passive RFID tags are employed since they are typically less expensive than active tags and they may have a long lifetime, in practice unlimited when compared to the average lifetime of a heavy-duty cable. Preferably, each RFID tag comprises an on-chip antenna integrated with a non-volatile memory microchip, in which an RF modulator/demodulator is integrated.

To increase the resistance of the electric cable to mechanical stresses, the outer jacket of a heavy-duty cable is typically made of a polymeric material hardened by curing, for example made of reinforced mould-cured heavy-duty thermosetting elastomer, such as polychloroprene (PCP) or rubber compounds, extruded on the internal layers, e.g., on the inner sheath 11. Most of the elastomeric materials suitable for the outer jacket of heavy-duty cables require a curing process after extrusion, typically carried out at temperatures of 180-200° C. for some minutes.

The Applicant has observed that the identification tags need to withstand the relatively high temperatures of the manufacturing processes necessary for completion of the cable. Furthermore, it is desirable that the tags resist tight bends of the cable that often take place in dynamic applications, such as for heavy-duty cables employed in mobile installations.

Preferably, the RFID tag is encapsulated in a hardened resin having a semi-lentil or lentil shape to improve mechanical resistance. Hardened resin can be for example an epoxy resin.

For example, RFID tags may have a rectangular shape with area of from 50 to 500 mm$^2$ and thickness from 1 to 5 mm.

Examples of RFID tags suitable for the present invention are D7-TAG 2k, D7-TAG 16k and D7-TAG 32k, commercialised by Microsensys GmbH.

In FIG. 1, the cable is assumed to be in a substantially untwisted (i.e. torsion free) condition. As used herein, the term "substantially untwisted condition" is intended to describe an initial reference condition of the cable, which may correspond to a condition before handling the cable from its original drum provided by the manufacturer (i.e., "as-manufactured"), for example, before their transfer to winding and anchoring reels or tender and pulley systems. In most practical cases relating to heavy-duty cables, however, the reference condition refers to the cable after installation in the mobile equipment or in a windmill, i.e., after transfer from the original drum and before employment, thus before being exposed to relevant torsional stresses.

A twisted condition comprises any cable state different from the substantially untwisted condition.

In a preferred embodiment, the plurality of identification tags of a cable are disposed on a peripheral surface of the cable along a generatrix, indicated in FIG. 1 with reference number 18, which can be substantially parallel to the central longitudinal axis Z. In this way, when the cable is in a substantially untwisted state, each of the tags are positioned with a nearly equal angle, e.g., within ±10°, with respect to a respective imaginary axis in a cable transversal section perpendicular to the central longitudinal axis and passing through the tag, and assuming that the so-defined imaginary axes are parallel one to another.

Initial arrangement of the tags along a generatrix, hereafter the generatrix of reference, of the cable may simplify the manufacturing process of placing the tags within the internal structure of the cable. However, within the scope of the present invention, initial near longitudinal alignment of the tags along the cable length is not necessary and in general, the i-tag, with i=1, 2, . . . , n, with n the number of tags in the plurality, is associated with a reference angle, $\alpha^0_i$, corresponding to the substantially untwisted condition.

Figure 3:
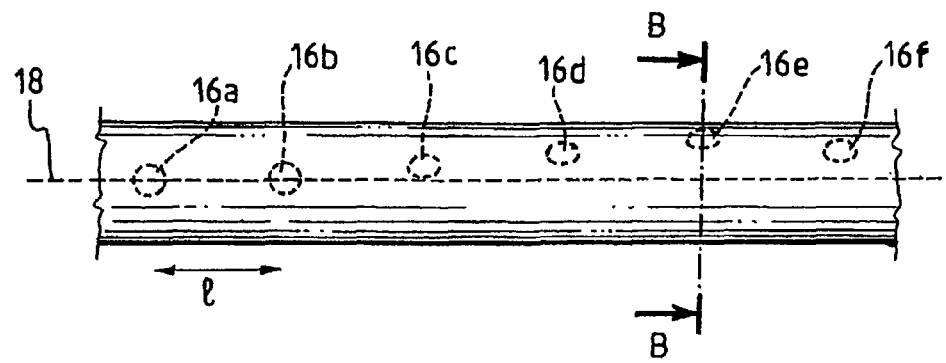
FIG. 3 is a top plan view of a cable, exemplifying a distribution of identification tags along the cable length after the cable has been subject to a twisting.

In working conditions, the cable can be subject to torsion forces and relevant rotations that can be present and be different in different sections along the cable. FIG. 3 is a partial top plan view of the cable that exemplifies a twisted condition when the cable of FIG. 1 has been exposed to significant torsional stresses. RFID tags 16a to 16f are shown. For instance, it can be assumed that one end of the cable is fixed and torsion takes place in a longitudinal portion of the cable. Due to the cable rotation, there exists an angular misalignment of the RFID tags with respect to the generatrix of reference 18, in a portion of the cable length. In particular, in the example of FIG. 3, RFID tags 16c, 16d, 16e and 16f are located on generatrices different from the generatrix of reference 18.

Figure 4:
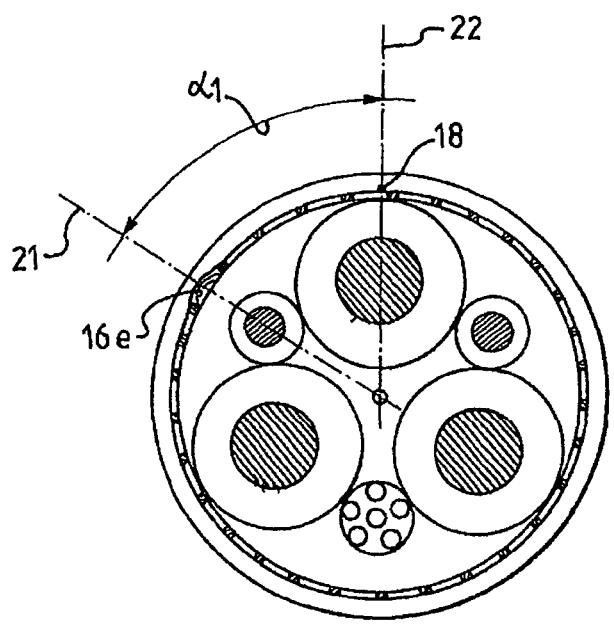
FIG. 4 is a cross-sectional view of the cable of FIG. 3 taken along the B-B line.

FIG. 4 is a cross-sectional view of FIG. 3 taken along the B-B line perpendicular to a cable longitudinal axis, such as the central longitudinal axis Z, and crossing RFID tag 16e. In the represented cable cross-sectional plane, the imaginary axis 21 passing through the tag 16e forms an angle $\alpha_1$ with respect to an imaginary reference axis 22 in the same cross-sectional plane crossing the generatrix of reference 18. The angular variation due to cable rotation is defined as $\Delta\alpha_1 = \alpha_1 - \alpha_1^0$, where $\alpha_1$ is the actual angular position (twisted condition) and $\alpha_1^0$ is the reference angle for tag 16e.

In general, by knowing the reference angle, $\alpha_i^0$, i=1, 2, . . . , n, of each tag of the plurality of tags and by measuring the angular position, $\alpha_i$, of an i-tag at a certain time, for example during cable operation, it is possible to determine the angular variation, $\Delta\alpha_i$, which is indicative of a rotational state of the cable in a longitudinal portion of the cable in the proximity of the i-tag. As the cable is constrained on at least one of its ends—either because connected to a power supply system or because of friction in a portion of the length thereof—, a value of the angular variation different from zero is indicative of the presence of a torsional stress at some location along the cable.

In the embodiment illustrated in the figures, it is assumed that the longitudinal distance, along the axis Z, between two adjacent RFID tags is substantially constant with value l, e.g., l=1 m. However, as described more in detail in the following, it is to be understood that it is not necessary that the identification tags are placed along the cable length at regular intervals.

Figure 5:
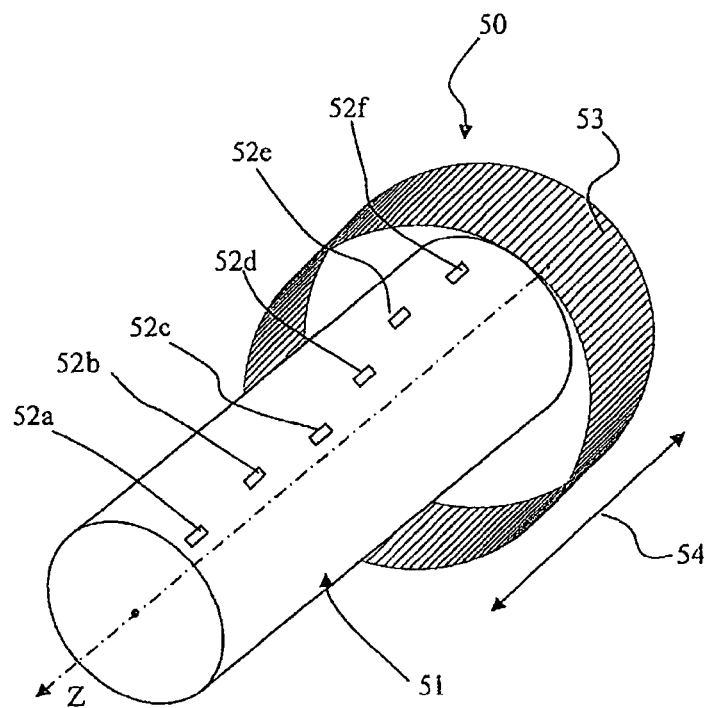
FIG. 5 is a diagrammatic representation of a cable torsion monitoring system, according to an embodiment of the present invention.

According to a main aspect of the present invention, the identification tags are detectable by a reading device that is configured to measure the angular position of at least one tag of the plurality of identification tags in a cross-sectional plane with respect to a cable longitudinal axis. Preferably, the cross-sectional plane is a plane perpendicular to the cable longitudinal axis. FIG. 5 schematically illustrates an embodiment of the present invention of a torsion monitoring system for monitoring the torsion in a cable 51 comprising a plurality of RFID tags 52a, 52b, . . . , 52e disposed along the cable length. The tags are built-in in the cable, for instance they are arranged under the cable outer jacket (internal structure of the cable not shown). An RFID reading device 50 having a ringlike shape is arranged with respect to the cable 51 so as to encircle the circumferential outer surface of the cable in correspondence to a certain longitudinal portion of the cable.

The RIFD tags store in their memory circuitry (e.g., microchip) a univocal tag identification code and they are preferably passive tags.

In general terms, the reading device comprises at least one transceiver, wherein the transceiver comprises an interrogation source, coupled to an antenna for transmitting and receiving an interrogation signal in an interrogation zone and a detector for processing the signals produced by the tags in the interrogation zone, also coupled to the antenna. When a passive RFID tag is the interrogation zone, it sends a tag RF signal triggered by the interrogation signal. The returned tag RF signal is received by an antenna of the reading device and transmitted to the detector, which decodes the response (namely, "reads" the identification code and other possible coded data) and identifies the tag.

The at least one transceiver emits an RF carrier signal activating the tag and the electromagnetic field produced by the transceiver induces a small electrical current in the tag antenna. In particular, when an RFID tag passes through the transceiver's interrogation zone, i.e., the region where a RFID tag can be activated and thus read by the transceiver. The reader device then decodes the data encoded in the tag's memory circuitry, thereby uniquely identifying the tag.

The reading device scans the outer circumferential surface of the cable for detection of an RFID tag located or passing through the interrogation zone. When an i-th RFID tag is detected, its angular position, $\alpha_i$, is also detected. The reading device may either store the decoded identification code and the measured angular position of the i-tag or pass the data to a control unit (not shown). Preferably, the data are fed to a control unit, such as a personal computer (PC) or a programmable logic controller (PLC), apt to process the received data. In some embodiments, the control unit is configured to associate the i-tag to a reference angular position, $\alpha_i^0$, and from that to calculate the angular variation, $\Delta\alpha_i$, which is indicative of the local twisting of the cable and in general is indicative on whether the cable is subject to a torsional state at some place along the cable length or at some cable longitudinal section. When the angular variation is calculated for a plurality of adjacent tags, a curve representing the angular variation as a function of the cable length can be determined and compared to either a reference curve made of reference angular positions vs. cable length or to a curve determined from previous measurements.

In some embodiments, the reading device 50 is placed in a fixed position with respect to the moving cable, which in general can move along the opposite longitudinal directions, which are indicated in FIG. 5 with double-arrow 54, so that different longitudinal portions of the cable pass through with the interrogation zone(s) of the reading device, and thus different RFID tags are detectable by the reading device.

In case of a cable passing "back and forth" through the reading device, a same RFID tag of the plurality of tags can be measured at different times. This allows the evaluation of the local rotational state of the cable by performing consecutive readings of the same RFID tag at different times.

In particular, the reading device 50 detects an i-tag a first time and measures a first angular position of the detected tag. The first angular position associated with the i-tag is stored, for example in the control unit connected to the reading device. At a later time, when the i-tag passes again through the reading device, the reading device detects the i-tag a second time and measures a second angular position. The first angular position can be taken as the reference angular positions and the successive measurements of the angular positions of the i-tag, when the i-tag crosses the interrogation zone of the reading device and thus it is again detected, can be associated to the first angular position so as to determine the temporal evolution of the rotational state of the cable longitudinal portion in the proximity of the i-tag.

The temporal evolution of the angular positions can be for instance analysed by comparing a reference curve represented by the reference angular positions of a plurality of tags along the cable length with one or more curves formed by the measured angular positions at different times after successive passages through the reading device.

In some embodiments, the angular variation is the difference between a first angular position (e.g., the reference angular position) and a second angular position associated to the same tag. As the reading device is generally able to measure angles between 0 and $2\pi$, measurement of a "true" angular variation of an i-tag at a given time t, takes into account possible single or multiple $2\pi$-rotations of the cable. As the cable can rotate in two possible directions, clockwise or counter clockwise, these two different directions may be distinguished, for example, by assigning positive angle values to clockwise rotations and negative ones to counter clockwise (or vice versa). To determine the angular variation at time t for the i-tag (i=1, 2, ..., n), a cable angle reference measurement is established by assessing the angular position and, preferably the longitudinal position, of each tag at a reference time, $t_0$, which can correspond, for example, to the cable installation moment. The assessed value is the reference angular position $\alpha_i^0$ (reference angle for the i-tag). For example, the first tag close to a cable fixed end, e.g. the 1-tag, has a reference angular position $\alpha_1^0$. When a value of angular position, $\alpha a_1$ (measured value, between 0 and $2\pi$), is read by the reading device at acquisition time t1, the corresponding "true" angle value $\alpha_1^T$, i.e. the angle of rotation for the 1-tag at time t1, is calculated as follows. Angle $\alpha_1^T$ is the value among the values $(\alpha_1-2\pi)$, $\alpha_1$ and $(\alpha_1+2\pi)$ which, subtracted to the reference value $\alpha_1^0$, is comprised between $-\pi$ and $+\pi$ (only one among the three mentioned values can satisfy the condition). The "true" angular variation, $\Delta\alpha_1$, is then given by $(\alpha_1^T-\alpha_1^0)$.

The next step is the detection of an adjacent tag. The distance between two next adjacent tags, or more generally between two subsequently measured tags, since some tags may occasionally be skipped by the reading device, should be small enough that the angular torsion of the cable between them is comprised between $-\pi$ and $+\pi$ (clockwise or counter clockwise, extremes excluded, e.g. $-\pi<(\alpha_i^T-\alpha_{i-1}^T)<+\pi$). If this condition is not satisfied, it is not possible to determine whether the cable turned clockwise or counter clockwise and then it is impossible to determine the "true" angle and the "true" angular variation of the detected tag. The measurement of the adjacent tag, for example the 2-tag, will give a measured value $\alpha_2$, always between 0 and $2\pi$, acquired at a time t2>t1. The "true" angular position $\alpha_2^T$ is determined by comparing the three values $(\alpha_2-2\pi)$, $\alpha_2$ and $(\alpha_2+2\pi)$ with the last true angular position of the last previously measured tag, i.e. $\alpha_1^T$. Only one of the three values subtracted to $\alpha_1^T$ results in a value comprised between $-\pi$ and $+\pi$ and that is the "true" angle value $\alpha_2^T$. The corresponding "true" angular variation of the 2-tag is then given by $(\alpha_2^T-\alpha_2^0)$, where $\alpha_2^0$ is the reference angle for the 2-tag. The process steps for determining the angular variation of the 2-tag are repeated for the next measured tag and in general can be reiterated to determine the angular variation of a plurality of detected tags.

It is however to be understood that the present invention is not limited to a particular selection of the algorithm for the determination of the temporal angular variation of the RFID tags.

Figure 6:
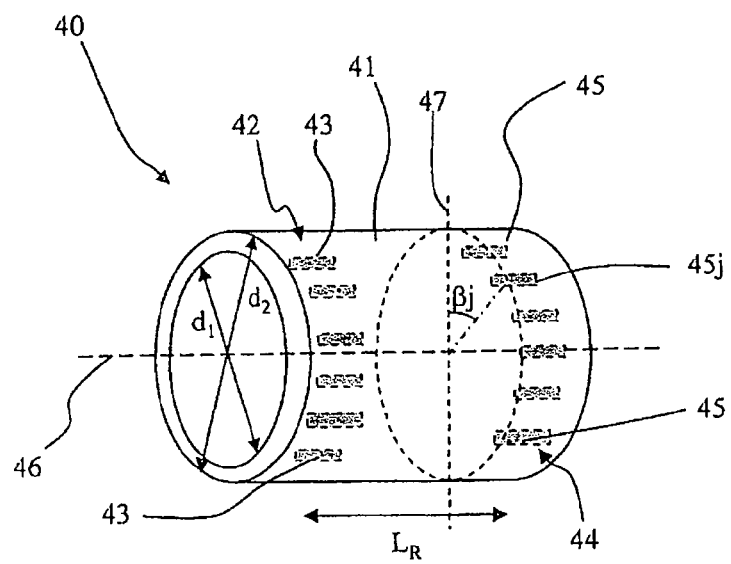
FIG. 6 is a schematic perspective view of a reading device in an embodiment of the present invention.

FIG. 6 is a diagrammatic perspective view of a reading device, according to a preferred embodiment of the present invention. A reading device 40 comprises a hollow cylindrical body 41 open at a first end and a second opposite end so that a cable can move longitudinally through it. The symmetry longitudinal axis of the cylindrical body is indicated in FIG. 6 with reference numeral 46. The cylindrical body has an inner diameter $d_1$ and an outer diameter $d_2$. Preferably, the inner diameter $d_1$ of the cylindrical body differs from the outer diameter of the cable to be measured of not more than 2 cm.

Although not shown in the figure, two pairs of orthogonal rollers at the entrance and at the exit of the cylindrical body, respectively, guide the cable in and out the body, thereby preventing friction between the cable outer sheath and the cylindrical body inner surface. Rollers can be positioned along the longitudinal axis 46 and can be for example fixed on the frame structure of a mobile equipment.

A first plurality 42 of transceiver antenna chips 43 and a second plurality 44 of transceiver antenna chips 45 (indicated in the figures with a dashed line) for interrogation of the RFID tags are arranged around the inner surface of the cylindrical body 41 so as to form two annular arrays of transceivers. The first and second plurality of transceiver chips are spaced apart axially along the axis 46 of the cylindrical body 41. Preferably, the first plurality 42 of transceiver chips is located in the proximity of the first open end of the body 46 and the second plurality 44 of transceiver chips is located in the proximity of the opposite second open end of the body. Spacing between the centres of the first array and of the second array is indicated with $L_R$, which can be for example of from 100 to 500 mm.

Each transceiver chip of the first and second plurality can be of conventional type and comprise an interrogation source and a detector, both coupled to an antenna arranged on the chip surface. Each transceiver is connected to an integrated feeding electronic circuit so that it works as an RFID reader, and the electronic circuit is connected (wireless or through a wired link) with a PC or PLC, which elaborates the detected information data. Chip antennas can have for example rectangular shape and can be 2-3 cm long and 1 cm wide and they are preferably disposed with their length along the longitudinal axis 46. In typical configurations, dimension of a transceiver chip approximately correspond to the dimension of the antenna provided on the chip, for example of an antenna wire coiled on the chip surface or of the patterned area of an antenna printed on the chip surface.

To easy the installation of the reading device around the cable and, possibly, onto a specific part of the mobile installation carrying the reading device, the reading device can comprise a cylindrical body formed by two semi-cylindrical members (not shown) that can be mechanically joint, such as hinged on each other, in any conventional way.

The transceiver chips of each of the first and second plurality are mounted around the inner surface of the cylindrical body at a given circumferential distance from one to another. Specifically, the transceivers of each plurality are radially spaced apart at predetermined reading angular positions, so that each transceiver can be associated to a respective reading angular position. Each transceiver is identified by a univocal reading identification code.

Transceivers are configured to encircle the cable and to read information from a RFID tag disposed within the electromagnetic zone of the reader device at predetermined angles around the whole cable circumference. In FIG. 6, an exemplary angular position $\beta_j$ of a transceiver chip 45$j$ of the second plurality of chips is indicated. Reading angular position $\beta_j$ is taken in a cross-sectional plane passing through the chip 45$j$ and orthogonal to the symmetry axis 46 with respect to a reference axis 47 in the same cross-sectional plane and orthogonal to axis 46.

In an embodiment, the centers of the transceiver chips are arranged at a constant angular distance from one another.

In some embodiments, the transceiver chips of each plurality are radially arranged so that their centers lay side-by-side in a common cross-sectional plane orthogonal to the symmetry axis 46. In that case, the spacing, $L_R$, between the first and second plurality of transceiver chips is given by the axial distance between the two common cross-sectional planes.

Preferably, the two pluralities of transceiver chips are mutually staggered from one another, namely they are arranged on the circumferential plane of the inner surface so that each chip of the first plurality 42 is located at a different angular position from those of each chip of the second plurality 44, with respect to a longitudinal axis lying in the circumference plane of the inner surface. In an embodiment, the number of transceiver chips and their angular distance is the same for the two annular arrays. The angular shift, or staggering, between the two annular chip arrays is selected so that an axis on the cylinder inner surface and parallel to the cylinder symmetry axis 46 intersects only one transceiver chip, either in the first or in the second array. When a cable equipped with a plurality of RFID tags moves through the cylindrical body of the reading device 40, and neglecting the rotation of the cable within the relatively short length of the reading device, an RFID tag moves in a line parallel or nearly parallel to the cylinder symmetry axis and it is detected by a transceiver chip of either the first array or of the second array. This can improve the angular resolution of the reading device, as described more in detail in the following.

More generally, the angular distance between two next adjacent transceivers of an annular array determines, together with the dimensions of the antennas, the angular resolution of the measurements. In particular, a relatively small circumferential distance could make two next adjacent transceivers interfere with one another when reading an RFID. Although ideally an RFID tag should be read by a single transceiver, dimensional constraints of the hollow cylindrical body, for example due to the requisite of proximity of the interrogation source to the outer surface of the cable to be measured, set in practice a range of angular distances between the transceivers, which depends also on the dimensions of commonly commercially available transceiver chips. In some configurations, for example when the tag to be measured is at an angular position between two transceiver chips, namely the tag angular position is located within the overlap of the interrogation zones of two respective transceivers, simultaneous detection of the same RFID tag by more than one transceiver may occur.

For example, the angular distance between next adjacent transceiver chips in each annular array is of from 20° to 30°, and preferably it is the smallest possible to avoid interference. In an embodiment, the reading device comprise two staggered transceiver arrays with angular distance of 30°, and staggering shift of 15°, providing a nominal angular resolution of 15°, if the spacing, $L_R$, between the two arrays along the longitudinal direction of the moving cable within the device is large enough to distinctly detect the moving tag either with a chip of the first array or with a chip of the second array.

Each transceiver is associated to a reading identification code and to a reading angular position within the reading device, wherein the reader identification code is stored in the transceiver chip and the reading angular position is retrievable in the control unit, e.g., PC, that elaborates the information data. When an RFID tag is read, the control unit stores the tag identification code and associate that code with the reading angular position of the transceiver that detects the tag. In some embodiments, as the transceiver detecting the tag is identified by the reading identification code, the control unit associate said code with the reading angular position. If more than one transceiver detects the same RFID tag during its passage through the reading device, a single angular position is selected, for example the average between the detected values.

In an embodiment (not shown in the figures), the reading device comprises a single annular array of transceivers arranged around the inner surface of the cylindrical body. Centers of the transceiver chips in the array can lie on a common plane orthogonal to the longitudinal axis and placed at any axial location of the cylindrical body or on different orthogonal planes distributed along the body's length.

Although it is preferred that at least one plurality of transceivers is arranged so as to surround the outer surface of the cable, the invention encompasses a reading device in which the at least one plurality of transceivers surround at least one portion of the cable outer surface.

Figure 7:
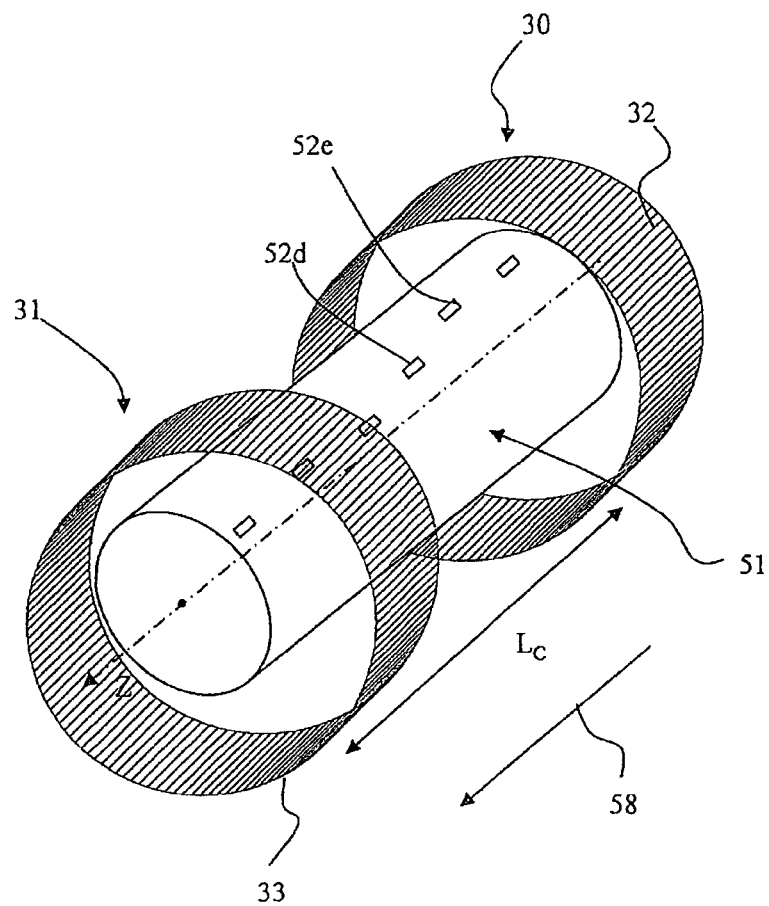
FIG. 7 is a diagrammatic representation of a cable torsion monitoring system, according to another embodiment of the present invention.

FIG. 7 is a schematic illustration of a torsion monitoring system for monitoring the torsion in a cable 51 comprising a plurality of RFID tags 52a, 52b, . . . , 52d, 52e, . . . disposed along the cable length, according to another embodiment of the present invention. Same reference numbers are used to identify like components having the same or similar functions to the elements of FIG. 5. For clarity reasons, only tags 52d and 52e are indicated with referral numbers. The monitoring system comprises a first reading device 30 and a second reading device 31, which are arranged at a fixed position with respect to each other and are separated by a fixed and known distance, $L_C$, which can be for example measured at the moment of the installation thereof. The cable 51 is movable relatively to the reading devices along at least one longitudinal direction 58 in such a way that a RFID tag can be detected by both reading devices at different times. In particular, an i-tag when passing through the first reading device 30 is detected and a first angular position, $\alpha_i^1$, is measured. After a distance $L_C$, the same i-th tag is detected by the second reading device 31 and a second angular position, $\alpha_i^2$, is measured. For example, $L_C$ can be of from 20 cm to 200 cm.

An angular variation between the measured first and second angular positions for the same tag, $\Delta\alpha_i = \alpha_i^1 - \alpha_i^2$, is indicative of a rotational state of the cable, which causes the cable to move from one reading device to the other in a torsional state. If the cable has at least one fixed end, the angular variation is indicative that torsion has taken place in the cable between the two reading devices. The cable passes first through the first reading device 30 or to the second reading device 31 depending on the direction of the cable longitudinal movement. In the above description, it was assumed that the cable moves from the first reading device to the second reading device. It is understood that the cable can move in opposite longitudinal directions relatively to the reading devices.

The first and second reading devices 30 and 31 encircle the outer circumferential surface of the cable and comprise respective cylindrical bodies 32 and 33.

Each of the two reading devices 30 and 31 is configured to detect and decodes the identification code stored in the i-tag and to detect the angular position of the tag. Each of the reading devices can comprise at least one plurality of transceivers radially arranged to surround the outer circumference of the cable to be measured, as described more in detail with reference to FIG. 6. Information data containing the tag identification code and the measured angular position are passed to at least one control unit.

In an embodiment, the monitoring system comprises a first and second control unit (not shown) connected, e.g., via a wired or a wireless link, respectively to the first and second reading device and being apt to process the data received from both reading devices. In another embodiment, the monitoring system comprises a control unit that can communicate via a wireless or a wired link to both reading devices. Each RFID tag is identified by a unique tag identification code and is detected by nominally one transceiver identified by a univocal reading identification code that is associated to a reading angular position. In case of two spaced apart reading devices, the reading identification code of each transceiver is preferably univocal to both reading devices so that it is possible to associate the code to either reading device within the torsion monitoring system. Spatial sequence of the tags along the cable is known, e.g. it can be provided by the manufacturer, and can be stored in the control unit. By knowing the spatial sequence, the control unit can derive the direction of cable movement between the two reading devices. Different passages of an i-tag are characterised by different acquisition times.

In some embodiments, a threshold value for the angular variation can be defined, beyond which the cable is acknowledged to be permanently damaged and thus it is to be replaced. In most practical cases, however, the threshold value can be indicative of a "warning" status of the cable, in which torsion may not have permanently damaged the cable, but may lead to a cable's wear. In an embodiment, if the threshold value is exceeded for a predetermined number of times, then the cable is evaluated to be damaged by fatigue.

RFID tags have practical reading distances depending on the chosen radio frequency and on the size and shape of their antenna. The Applicant has noted that, if the reading distance is too small, a RFID tag may not be accurately detected because of the relative movement between the cable and the reader device. On the other hand, if the reading distance is too large, the RF signals emitted from two next adjacent in the cable longitudinal direction may interfere with each other, to the detriment of the measurement accuracy. Preferably, the RFID tags have a reading distance ranging from 0.5 cm to 20 cm. In an embodiment, the operating frequency of the RFID tags (and of the at least one reading device) is of about 13.56 MHz.

In general, the distance between next adjacent identification tags along the cable can be random and unknown. It is however preferred that such distance is equal or larger than a minimum distance, $l_0$, which allows resolving detection of two next adjacent tags. The capability to resolve the reading of two next adjacent tags depends on the speed of the cable passing through the reading device, for example during winding/deployment of the cable, which can typically range from 1 to 4 m/s. In some embodiments, the minimum distance, $l_0$, is 0.5 m.

As described above, although it is preferred that the reading device is apt to detect substantially each tag of the plurality of identification tags, the present invention encompasses a monitoring system in which the reading device does not read in sequence all next adjacent tags. This may occur if the speed of the cable passing through one or more reading devices is larger than a maximum speed allowed for detection of each tag passing the interrogation zone. In an embodiment, the maximum speed is of 4-5 m/s. For example, the reading device may miss some tags passing in its interrogating zone(s). In case the reading of a tag is skipped, an angular value is assigned to the missed tag. For example, the angular value determined from the last previous measurement taken on that tag can be assigned as a fictitious angular value. Alternatively, the angular value determined on an adjacent tag measured immediately before or after the passage of the missed tag in the interrogation zone can be assigned. In an embodiment, a polynomial interpolation of the curve of angular values vs. tag sequence passing through the measured tags can be used to derive the angular value to be assigned to the missed tag.

Depending on the design of the reading device, it may also occur that an RFID tag is measured more than once during a single passage through the device. With reference to the embodiment illustrated in FIG. 6, this may take place when two transceivers from different arrays or two next adjacent transceivers within the same array detect the same tag, In this case of close reading involving the same tag, the algorithm in the control unit can be set to consider and store only a single value.

Figure 8:
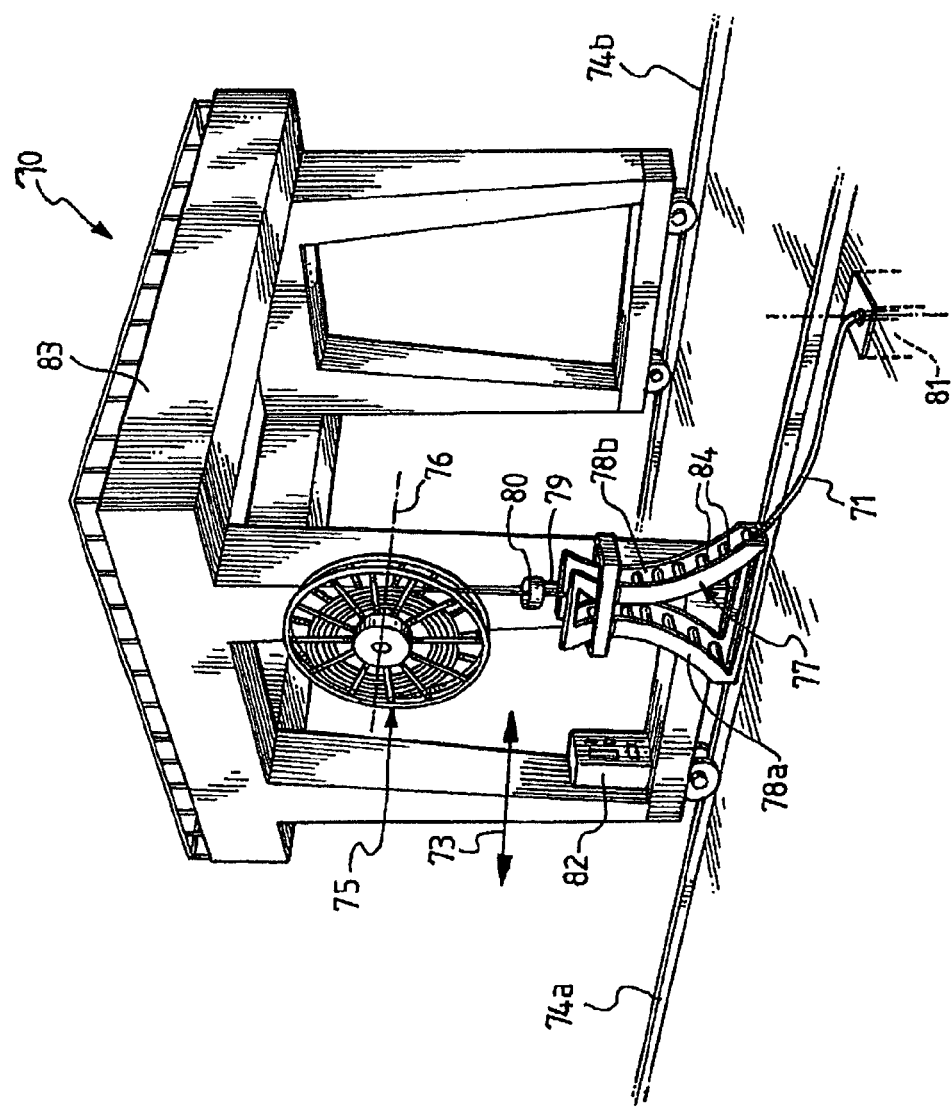
FIG. 8 is a schematic perspective view of a mobile equipment for heavy-duty applications, which is powered by a heavy-duty cable, comprising a torsion monitoring system according to an embodiment of the invention.

FIG. 8 is a schematic perspective view of a mobile equipment for heavy-duty applications, which is powered by a heavy-duty cable, comprising a torsion monitoring system according to an embodiment of the invention. Without wishing to limit the possible applications of the present invention, the embodiment of FIG. 8 shows a heavy-duty crane 70 for the movements of goods, such as cargo and especially containers across a selected area of a container terminal or of a wharf in a port. Heavy duty crane 70 lifts and transfers containers while being powered and controlled from a power deliver station (not shown), generally located remotely from the crane. Heavy duty crane 70 can be a gantry crane running on a pair of fixed rails 74a and 74b along opposite horizontal directions indicated by the double arrow 73. The supporting structure of the gantry crane 70 comprises a bridge 83 typically provided with a winch trolley that moves perpendicular to the motion of the crane to hoist the containers (winch trolley and hoisting system not shown in the figure).

The gantry crane is powered by a heavy-duty cable 71, connected to a crane supply unit 81 for providing power for all movements of the crane, and preferably for sending and receiving control data for remote control of the crane operation. Although not shown in the figure, a conventional power cable can be connected from the crane supply unit 81 to a remote power delivery station.

The heavy-duty cable 71 is wound around a cable reel 75 fixed onto a lateral side of the crane structure. The cable reel 75 can be motorised so as to allow rotation of the reel in both directions.

Heavy-duty cable 71 has one end fixed into the crane supply unit 81 and the opposite end fixed at the cable reel 75, typically at its centre, referred to as the feed centre, corresponding to the reel rotational axis 76. Heavy-duty cable is thus constrained at both ends when winding and unwinding phases of the cable around the reel take place during swift horizontal movements of the crane. Guidance of the cable 71 to the crane supply unit 81 is provided by a cable guidance device 77 for forced lateral guidance of the vertically suspended cable exiting the reel 75.

Figure 9:
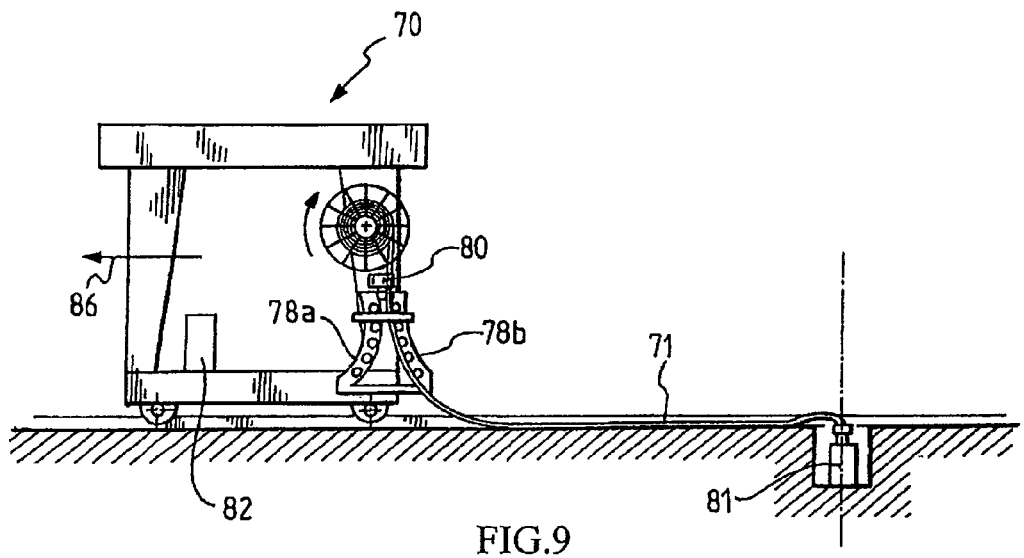
FIGS. 9 and 10 are lateral views of the mobile equipment of FIG. 8, showing, respectively, the mobile equipment running in opposite forward directions with respect to a cable supply unit.
Figure 10:
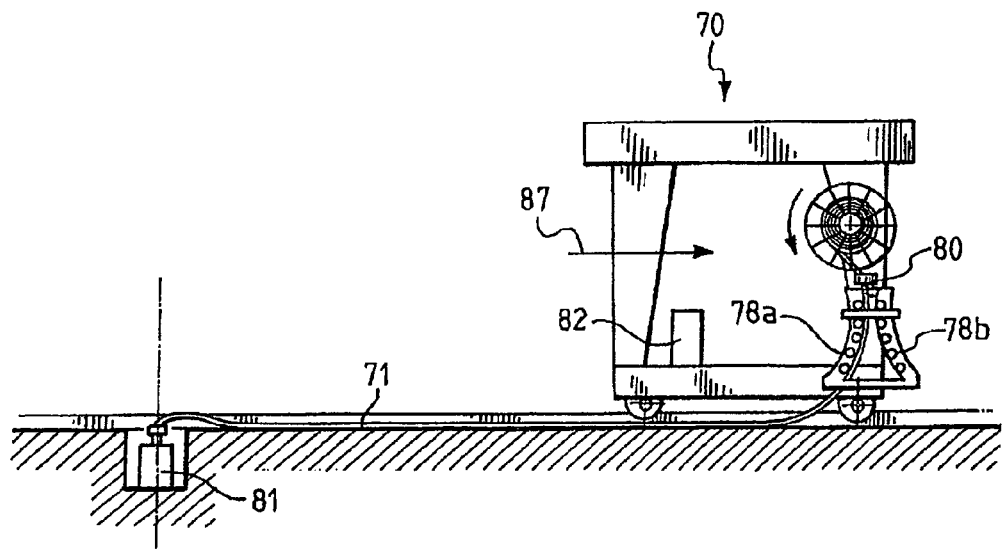

The Applicant has observed that even in well designed cable guidance devices, significant twists can be imparted to the cable during the movements of the crane. In the example shown in FIG. 8, cable guidance device 77 comprises a pair of oppositely positioned guidance rollers 78a and 78b with respect to the direction of the crane motion, for allowing the cable to be guided during movements of the crane on either side of the rails with respect to the crane supply unit. The crane supply unit can be placed at a middle position alongside the rails with respect to the length of the rails. According to conventional designs, each guidance roller 78a and 78b can include roller bearings 84, fitted in a V-groove or a profile rail. The guidance rollers form a deflection angle with respect to the vertical direction of the cable entering the guidance device. FIGS. 9 and 10 are plan views of the crane of FIG. 8 showing the movement in the opposite forward directions indicated with respective arrows 86 and 87 from the supply unit of the crane.

According to an embodiment of the present invention, heavy-duty cable 71 comprises a plurality of RFID tags arranged along the cable length in radially distributed angular positions (tags not indicated in the figure). For example, cable 71 can have a structure such that described with reference to FIGS. 1 and 2. The crane 70 is provided with a monitoring system comprising a reading device 80 capable of interrogating and identifying the RFID tags incorporated in the cable and of detecting the angular position of the identified tags. The reading device 80 is placed in the proximity of the guidance roller 77. In the embodiment of FIGS. 8-10, the reading device is mounted by conventional fixing elements 79, such as by a socket plate (visible in FIG. 8), to the upper portion of the guidance device 77. The reading device is arranged at the entry of the guidance device so that monitoring takes place on a longitudinal portion of the vertically suspended cable that is about to be deflected by either guidance roller.

Reading device 80 is shaped so as to encircle the cable 71 and to detect the angular position of the RFID tags on the whole circumferential surface of the cable. In an embodiment, the reading device 80 is of the type described with reference to FIG. 6.

Preferably, the angular resolution is not larger than 30°, more preferably not larger than 15°.

The reading device 80 is logically connected to a control unit configured to process and store the read RFID information data, including the tag identification code, and the measured angular positions associated with each of the read RFID data. The control unit (not shown in the figure) can be a micro-processor associated with—for example connected to—the reading device. The measured data are transferred, for example by means of an Ethernet cable, from the control unit to an electrical control panel 82, which is typically provided for electrical control of the operations of the motors for all movements of the crane and of the reel. The control panel 82 is mounted on one side of the lateral frame of the supporting structure of the crane and comprises an electric-to-optic (EO) medium converter, such as an Ethernet converter. At the output of the EO converter of panel 82, an optical fibre (not shown), for example a multimode optical fibre, runs along the frame of the crane to connect to an optical fibre of the same type comprised in the heavy-duty cable, for example by means of a fibre optic rotary joint, which is often present for allowing employment of additional fibres for transmission of control and data signals through the heavy-duty cable and thus to the power delivery station. The fibre optic rotary joint can be placed in correspondence of the feed centre of the reel. The optical fibre exiting the E/O converter carries optical data containing the (converted) data detected by the reading device. In this way, the data obtained from the torsion monitoring system can be displayed and/or analysed remotely from the crane, such as in the power delivery station. The optical fibre connecting the E/O converter to the feed centre of the reel and the Ethernet cable connecting the control unit to the E/O converter can run internally the frame structure of the crane and are thus not shown in the FIGS. 8-10. Alternatively, wireless communication can be employed for data transmission from the reading device 80 to the station elaborating the data.

Although in the embodiment of FIGS. 8-10 the reading device is located at the entry of the guidance device, it is to be understood that other configurations are possible. For example, the reading device can be placed in the proximity of a guidance roller end or a respective reading device can be positioned in the proximity of each guidance roller end so as to measure the rotation of the cable at the exit of the guidance device for both running directions of the crane.

As the cable is constrained at both ends, detection of an angular variation, and thus of a rotational state in the cable, indicates that torsional stresses are present at some location in the cable.

Figure 11:
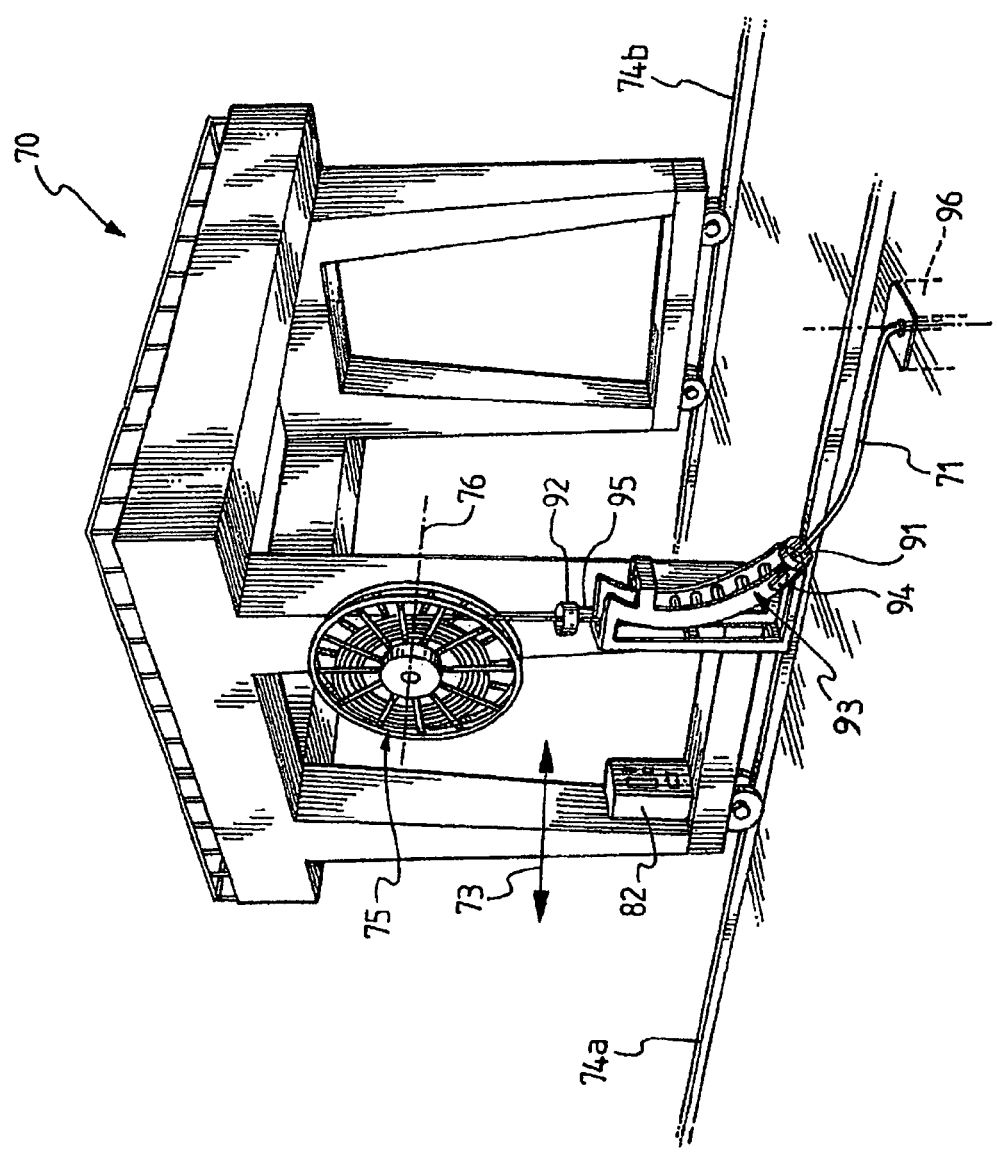
FIG. 11 is a schematic perspective view of a mobile equipment for heavy-duty applications, which is powered by a heavy-duty cable, comprising a torsion monitoring system according to a further embodiment of the invention.

FIG. 11 is a schematic perspective view of a mobile equipment for heavy-duty applications, which is powered by a heavy-duty cable, comprising a torsion monitoring system according to another embodiment of the invention. Same numbers are used to identify like components having the same or similar functions to the elements of FIGS. 8-10. With respect to the embodiment shown in FIGS. 8-10, the torsion monitoring system of FIG. 11 comprises a first and second reading devices 92 and 91. The first reading device 92 is arranged at the entrance of a guidance device 93 comprising a single guidance roller, whereas the second reading device 91 is placed close to the exit of the guidance roller. Reading devices 91 and 92 can be fixed to the structure of the cable guidance device 93 by conventional fixing elements, such as respective socket plates 94 and 95. The first and second reading devices are structured so as to encircle the heavy-duty cable 71, which passes, at different times, through the first and second reading devices. The order with which the cable passes through the first and the second reading devices depends on whether the cable is being wound or unwound from reel 75. The first and the second reading devices are separated by a fixed known distance. Measurement of the angular evolution of the cable from the fixed point where the first reading device 91 is placed to the second fixed point where the second reading device 92 is placed can be carried out according to the method described with reference to FIG. 7. The heavy-duty cable 71 is connected to a supply unit 96 positioned in the proximity of an end of rail 74*a*.

Each reading device 91 and 92 is connected to a respective control unit or to a single control unit, which is configured to store and process the information data detected by the reading devices. Similarly to what described with reference to FIG. 8, the control unit(s) are connected to the control panel 82 by means of a cable, such as an Ethernet cable. Assuming that an i-tag passes through the interrogating zone of the reading devices in the direction from the cable reel to the guidance device (i.e., unwinding phase), the first reading device 92 detects an angular position, $\alpha_i^1$, and the second reading device 91 detects angular position, $\alpha_i^2$. An angular variation $(\alpha_i^1 - \alpha_i^2)$ different from zero or is larger than a given threshold value is indicative of a rotational state of the cable.

A particular aspect of the present invention relates to a heavy-duty lifting crane comprising a supporting structure; a reel mounted on the frame structure; an electric cable wound around the reel and having a first and second end; a guidance device arranged on (e.g. mounted on) the supporting structure, the cable passing downstream the reel and entering the guidance device (e.g., passing over at least one guidance roller of the guidance device); a torsion monitoring system comprising at least one reading device being arranged so as to encircle a portion of the electric cable downstream the reel, and a control unit connected to the at least one reading device.

A particular embodiment of the present invention relates to windmill power generators.

Figure 12:
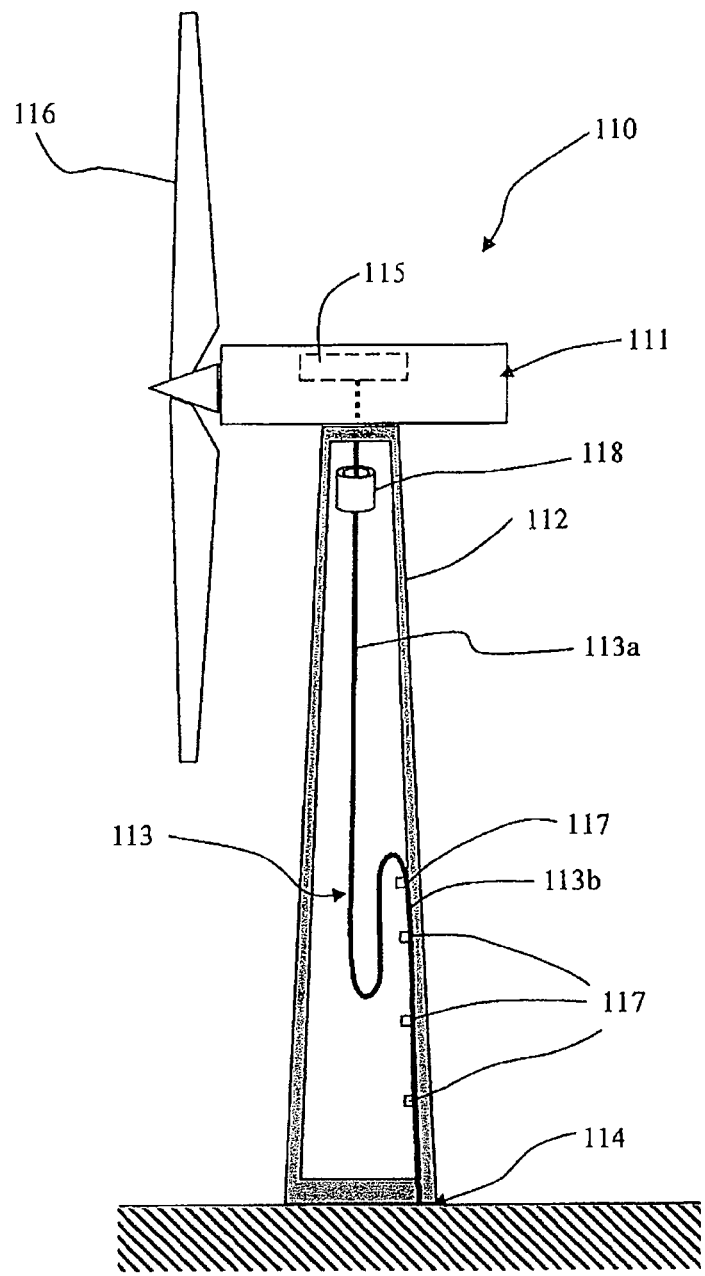
FIG. 12 is a diagrammatic representation of a windmill comprising a torsion monitoring system according to still another embodiment of the present invention.

FIG. 12 is a diagrammatic cross-sectional view of a windmill for electric power generation. A windmill 110 comprises a tower 112 arranged along a longitudinal axis and a nacelle 111 on top thereof. The nacelle 111 houses devices, known per se, for converting the rotational energy of blades 116 into electrical energy and including a generator system (not shown in the figure) and a transformer 115 indicated with a dashed line. The nacelle is apt to be pivoted with respect to the tower axis in order to follow the variation of wind direction.

A power cable 113 is provided in the windmill to connect the transformer 115 in the nacelle 111 to the tower base 114, where the generated electrical power is conveyed to the distribution network or delivered directly to an end user.

Typically, the power cable 113 is a tripolar cable and generally comprises three insulated power conductors and three earth conductors, each earth conductor being positioned in the interstitial area formed between two adjacent power conductors. The three power conductors and the three earth conductors are helically twisted and the whole assembly is successively coated with a cable outer jacket.

The cable is vertically arranged along the windmill tower, a first portion 113*a* of which is suspended freely inside the tower and a second portion 113*b* of which is fixed on a sidewall of the tower, for example by means of securing tools 117. Typically, cable length is of about 18-20 m, while tower height is of 60-100 m. Due to the rotational movement of the nacelle both in the clockwise and in the counterclockwise directions, the power cable is subjected to cycles of alternate torsional stresses. In particular, the torsional stresses arise in the cable length which is freely positioned within the tower, i.e. the cable length which exits from the transformer and is suspended within the tower before being fixed to the sidewall thereof. Consequently, the first portion 113*a* twists about its axis as the nacelle rotates. Generally, a windmill is operated to make three to five revolutions (of 360° each) in a given direction (e.g. clockwise) and then the direction of rotation is inverted (for example, five revolutions in the opposite direction, e.g. counterclockwise). On average, a windmill makes one turn/day since the wind direction generally varies not more than 180° in 24 hours.

The power cable 113 is provided with at least one RFID tag, arranged along the cable length extending vertically in the windmill tower. As cable 113 is constraint at two opposite ends and is not subject to substantial longitudinal movements along the tower axis, torsional stresses can be detected by providing the cable with a single RFID tag (not indicated in the figure). Preferably, the RFID tag is provided in the suspended portion of the cable, more preferably in the proximity of the nacelle that undergoes rotation. The RFID tag can be included in the cable structure during manufacturing stage or it can be attached to the cable outer sheath before or after cable installation.

A reading device 118 is provided in correspondence to the cable section provided with the RFID tag. The reading device can be of the type described with reference to FIG. 6, comprising at least one annular array of radially arranged transceiver chips.

Although it is preferred that the information data related to the reference angular position of the identification tags is stored remotely from the cable, such in the control unit connected to the reading device or in a remote PC, so as to simplify the manufacturing of a torsion-detectable cable, the present invention encompasses a cable wherein each of the plurality of identification tags arranged along the cable includes a memory unit storing information related to the reference angular position.

According to an aspect, the present invention is directed to a cable extending along a central longitudinal axis and comprising a plurality of identification tags arranged along the cable length, at least one tag of the plurality of identification tags comprising a memory unit, wherein the memory unit stores information related to a reference angular position of the at least one tag with respect to an imaginary axis of a cable transversal section passing through the tag in a plane perpendicular to the central longitudinal axis. Preferably, each of the plurality of the tags includes a memory unit storing the information related to the reference angular position.

Although in the detailed description reference has been made to an electric cable, the present invention encompasses a method and a system for measuring the torsion of an optical cable or a control cable wherein torsion detection and monitoring is needed.

The invention claimed is:

1. A method for monitoring torsion of a cable comprising:
providing a cable having an outer surface and extending along a longitudinal direction, the cable being provided with a plurality of identification tags arranged along a cable length in respective tag angular positions in cross-sectional planes taken transverse to the longitudinal direction, each tag storing a tag identification code and being capable of transmitting a tag electromagnetic signal;
interrogating at least one identification tag to receive the tag electromagnetic signal; and
detecting the tag electromagnetic signal for monitoring torsion of the cable, wherein detecting the tag electromagnetic signal comprises reading the tag identification code and determining the tag angular position of the at least one identification tag.

2. The method of claim 1, wherein each identification tag is a radio frequency identification tag capable of transmitting a radio frequency electromagnetic signal and interrogating at least one identification tag comprises transmitting interrogation radio frequency signals.

3. The method of claim 2, wherein each radio frequency identification tag is of passive type and transmitting interrogation radio frequency signals triggers transmission of a tag radio frequency signal by the radio frequency identification tag.

4. The method of claim 1, wherein interrogating the at least one identification tag is performed by employing at least one reading device capable of transmitting interrogation electromagnetic signals and of receiving the tag electromagnetic signal transmitted by the at least one tag.

5. The method of claim 1, wherein:
interrogating the at least one identification tag comprises transmitting interrogation electromagnetic signals from at least one plurality of transceivers radially arranged so as to surround at least one portion of the outer surface of the cable, the transceivers being spaced radially apart at predetermined reading angular positions;
detecting the tag electromagnetic signal is performed by at least one of the plurality of transceivers; and
determining the tag angular position of the at least one tag comprises associating a detected tag electromagnetic signal with the at least one transceiver performing the detection.

6. The method of claim 5, wherein associating the detected tag signal with the at least one transceiver comprises associating the read tag identification code with the reading angular position of the at least one transceiver performing the detection.

7. The method of claim 5, wherein associating the detected tag electromagnetic signal with the at least one transceiver comprises associating the detected tag signal with the reading angular position of the at least one transceiver performing the detection, said reading angular position being taken as the tag angular position.

8. The method of claim 5, wherein the transceivers of the at least one plurality are arranged side-by-side around a common circumferential plane taken across the longitudinal direction of the cable.

9. The method of claim 5, wherein the at least one plurality of transceivers comprises a first and a second plurality of transceivers spaced axially apart along a length of the reading device so that the first and the second pluralities surround at least one portion of the outer surface at different longitudinal locations of the cable.

10. The method of claim 9, wherein the transceivers of the first plurality are radially distributed at equally spaced first reading angular positions and the transceivers of the second plurality are radially distributed at equally spaced second reading angular positions, the first and second reading angular positions being mutually staggered from one another.

11. The method of claim 9, wherein the transceivers of the first and of the second plurality are radially distributed in such a way that the reading angular position of each transceiver of the first plurality is different from the reading angular position of each transceiver of the second plurality.

12. The method of claim 1, wherein interrogating at least one tag of the plurality is performed by employing at least one reading device comprising at least one plurality of transceivers radially arranged so as to surround at least one portion of the outer surface of the cable and the method further comprises, before interrogating at least one identification tag of the plurality, moving the cable relative to the at least one reading device.

13. The method of claim 12, wherein moving the cable relative to the at least one reading device comprises moving the cable in opposite axial directions so as to enable at least one identification tag to pass through the at least one plurality of transceivers at subsequent times.

14. The method of claim 1, wherein detecting the tag electromagnetic signal comprises determining a first tag angular position of the at least one identification tag at a first acquisition time and a second tag angular position at a second subsequent acquisition time of a same tag, and further comprising calculating angular variation between read first and second tag angular positions, the angular variation being indicative of a temporal evolution of a rotational state of the cable in proximity of the at least one tag in a cable length.

15. The method of claim 1, further comprising:
storing the detected tag identification code and tag angular position of the at least one tag;
associating the tag identification code to a reference angular position, and
determining angular variation between a measured angular position and a reference angular position, the angular variation being indicative of a rotational state of the cable in proximity of the at least one tag in a cable length.

16. The method of claim 1, wherein interrogating at least one tag of a plurality of tags is performed by employing a first reading device and a second reading device spaced apart from the first reading device by a predetermined reading distance, each reading device comprising a respective first and second plurality of transceivers radially arranged to surround at least one portion of the outer surface of the cable.

17. The method of claim 16 further comprising, before interrogating at least one identification tag of the plurality of tags, moving the cable relative to the first and second reading device so as to enable the at least one identification tag to pass through the first and the second plurality of transceivers at subsequent times.

18. A torsion monitoring system for a cable comprising:
- a cable having an outer surface and extending along a longitudinal direction, the cable being provided with at least one identification tag arranged in a tag angular position in a cross-sectional plane taken transverse to the longitudinal direction, the at least one tag storing a tag identification code and being capable of transmitting a tag electromagnetic signal; and
- a reading device capable of interrogating the at least one tag, of reading the tag identification code thereof and of detecting the tag angular position thereof for monitoring torsion of the cable, wherein the reading device comprises a plurality of transceivers radially arranged so as to surround at least one portion of the outer surface of the cable, the transceivers being spaced radially apart at predetermined reading angular positions.

19. The system of claim 18, further comprising at least one control unit logically connected to the at least one reading device and capable of processing the tag identification code and associating the tag identification code with the reading angular position of the at least one transceiver performing the detection.

20. The system of claim 18, wherein the at least one reading device further comprises a hollow cylindrical body having an inner and an outer surface, the inner surface facing the outer surface of the cable, wherein the at least one plurality of transceivers is radially spaced apart around the inner surface of the hollow body.

21. The system of claim 18, wherein the cable comprises a plurality of identification tags arranged along a cable length in respective tag angular positions.

\* \* \* \* \*